US012062874B2

(12) United States Patent
Kobayashi et al.

(10) Patent No.: US 12,062,874 B2
(45) Date of Patent: Aug. 13, 2024

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Kobayashi, Mie (JP); Hajime Kawase, Mie (JP); Masaaki Tabata, Mie (JP); Teruo Hara, Mie (JP); Hajime Matsui, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 362 days.

(21) Appl. No.: 17/598,350

(22) PCT Filed: Mar. 24, 2020

(86) PCT No.: PCT/JP2020/012896
§ 371 (c)(1),
(2) Date: Sep. 27, 2021

(87) PCT Pub. No.: WO2020/196478
PCT Pub. Date: Oct. 1, 2020

(65) Prior Publication Data

US 2022/0190533 A1 Jun. 16, 2022

(30) Foreign Application Priority Data

Mar. 28, 2019 (JP) ................................ 2019-063817

(51) Int. Cl.

| | |
|---|---|
| ***H01R 31/08*** | (2006.01) |
| ***H01R 4/28*** | (2006.01) |
| ***H01R 13/42*** | (2006.01) |
| ***H01R 13/629*** | (2006.01) |
| ***H01R 13/639*** | (2006.01) |

(52) U.S. Cl.
CPC ............... *H01R 31/08* (2013.01); *H01R 4/28* (2013.01); *H01R 13/42* (2013.01); *H01R 13/629* (2013.01); *H01R 13/639* (2013.01)

(58) Field of Classification Search
CPC .......... H01R 31/08; H01R 4/185; H01R 4/20; H01R 4/188
(Continued)

(56) References Cited

U.S. PATENT DOCUMENTS 5,000,699 A * 3/1991 Nadin .................... H01R 31/08 439/189
10,944,187 B2 * 3/2021 Takeuchi ............... H01R 4/188
(Continued)

FOREIGN PATENT DOCUMENTS

JP S15-000085 Y1 1/1940
JP H05-023422 U 3/1993
(Continued)

OTHER PUBLICATIONS

International Search Report issued on Jun. 9, 2020 for WO 2020/196478 A1 (6 pages).

*Primary Examiner* — Gary F Paumen
(74) *Attorney, Agent, or Firm* — Venjuris, P.C.

(57) ABSTRACT

A joint connector for connecting a plurality of wires includes a plurality of terminals to be respectively connected to front end parts in an extending direction of the plurality of wires, a busbar to be connected to the plurality of terminals, and a housing for accommodating the plurality of terminals and the busbar inside. The busbar includes a plurality of tabs and a coupling portion coupling the plurality of tabs. Each of the
(Continued)

plurality of terminals includes a tube portion, each of the plurality of tabs being insertable into the tube portion, a sandwiching portion extending along the extending direction and configured to sandwich the wire, and a sliding portion disposed outside the sandwiching portion and movable along the extending direction. The sliding portion includes a pressurizing portion configured to pressurize the sandwiching portion toward the wire with the wire sandwiched by the sandwiching portion.

6 Claims, 12 Drawing Sheets

(58) Field of Classification Search
USPC ................................ 439/507, 511, 877, 879
See application file for complete search history.

(56) References Cited

U.S. PATENT DOCUMENTS

| | | | | |
|---|---|---|---|---|
| 11,710,912 | B2 * | 7/2023 | Takeuchi | H01R 4/183 439/879 |
| 2006/0205270 | A1 | 9/2006 | Sakurai et al. | |
| 2013/0303016 | A1 | 11/2013 | Shimizu | |
| 2013/0316593 | A1 | 11/2013 | Shimizu | |
| 2019/0252803 | A1 | 8/2019 | Takeuchi et al. | |
| 2021/0234286 | A1 * | 7/2021 | Miyamura | H01R 13/02 |
| 2021/0234321 | A1 * | 7/2021 | Miyamura | H01R 31/08 |
| 2022/0181799 | A1 * | 6/2022 | Takeuchi | H01R 4/5066 |
| 2022/0190533 | A1 * | 6/2022 | Kobayashi | H01R 31/08 |
| 2022/0190534 | A1 * | 6/2022 | Kobayashi | H01R 4/5083 |
| 2023/0137240 | A1 * | 5/2023 | Takeuchi | H01R 4/183 439/877 |
| 2023/0198172 | A1 * | 6/2023 | Takeuchi | H01R 4/183 439/877 |

FOREIGN PATENT DOCUMENTS

| | | | |
|---|---|---|---|
| JP | 2015-056209 | A | 3/2015 |
| JP | 2018-005988 | A | 1/2018 |
| WO | 2019/159714 | A1 | 8/2019 |
| WO | 2019/159730 | A1 | 8/2019 |
| WO | 2019/159746 | A1 | 8/2019 |
| WO | 2019/225462 | A1 | 11/2019 |
| WO | 2019/235389 | A1 | 12/2019 |

* cited by examiner

JOINT CONNECTOR

CROSS REFERENCE TO RELATED APPLICATIONS

This application is a national phase of PCT application No. PCT/JP2020/012896, filed on 24 Mar. 2020, which claims priority from Japanese patent application No. 2019-063817, filed on 28 Mar. 2019, all of which are incorporated herein by reference.

TECHNICAL FIELD

The present disclosure relates to a joint connector.

BACKGROUND

Japanese Patent Laid-Open Publication No. 2018-005988 discloses a joint connector for connecting a plurality of wires to each other. A female terminal is connected to an end part of each of the plurality of wires. The female terminals connected to the end parts of the wires are accommodated in a mating connector.

The mating connector is connected to the joint connector. A busbar provided with a plurality of pin terminals is held in the joint connector.

By connecting the joint connector and the mating connector to each other, the plurality of wires are connected via the female terminals and the busbar including the pin terminals.

PRIOR ART DOCUMENT

Patent Document

Patent Document 1: JP 2018-005988 A

SUMMARY OF THE INVENTION

Problems to be Solved

However, according to the conventional art, the joint connector and the mating connector may rattle during an operation of connecting the both connectors. Then, there is a concern for a reduction in electrical connection reliability between the both connectors due to the deformation of the busbar or the sliding wear of the female terminals.

The present disclosure was completed on the basis of the above situation and aims to provide a joint connector improved in electrical connection reliability.

Means to Solve the Problem

The present disclosure is directed to a joint connector for connecting a plurality of wires, the joint connector including a plurality of terminals to be respectively connected to front end parts in an extending direction of the plurality of wires, a busbar to be connected to the plurality of terminals, and a housing for accommodating the plurality of terminals and the busbar inside, wherein the busbar includes a plurality of tabs and a coupling portion coupling the plurality of tabs, each of the plurality of terminals includes a tube portion, each of the plurality of tabs being insertable into the tube portion, a sandwiching portion extending along the extending direction and configured to sandwich the wire, and a sliding portion disposed outside the sandwiching portion and movable along the extending direction, and the sliding portion includes a pressurizing portion configured to pressurize the sandwiching portion toward the wire with the wire sandwiched by the sandwiching portion.

Effect of the Invention

According to the present disclosure, the electrical connection reliability of the joint connector is improved.

DETAILED DESCRIPTION TO EXECUTE THE INVENTION

Description of Embodiments of Present Disclosure

Figure 1:
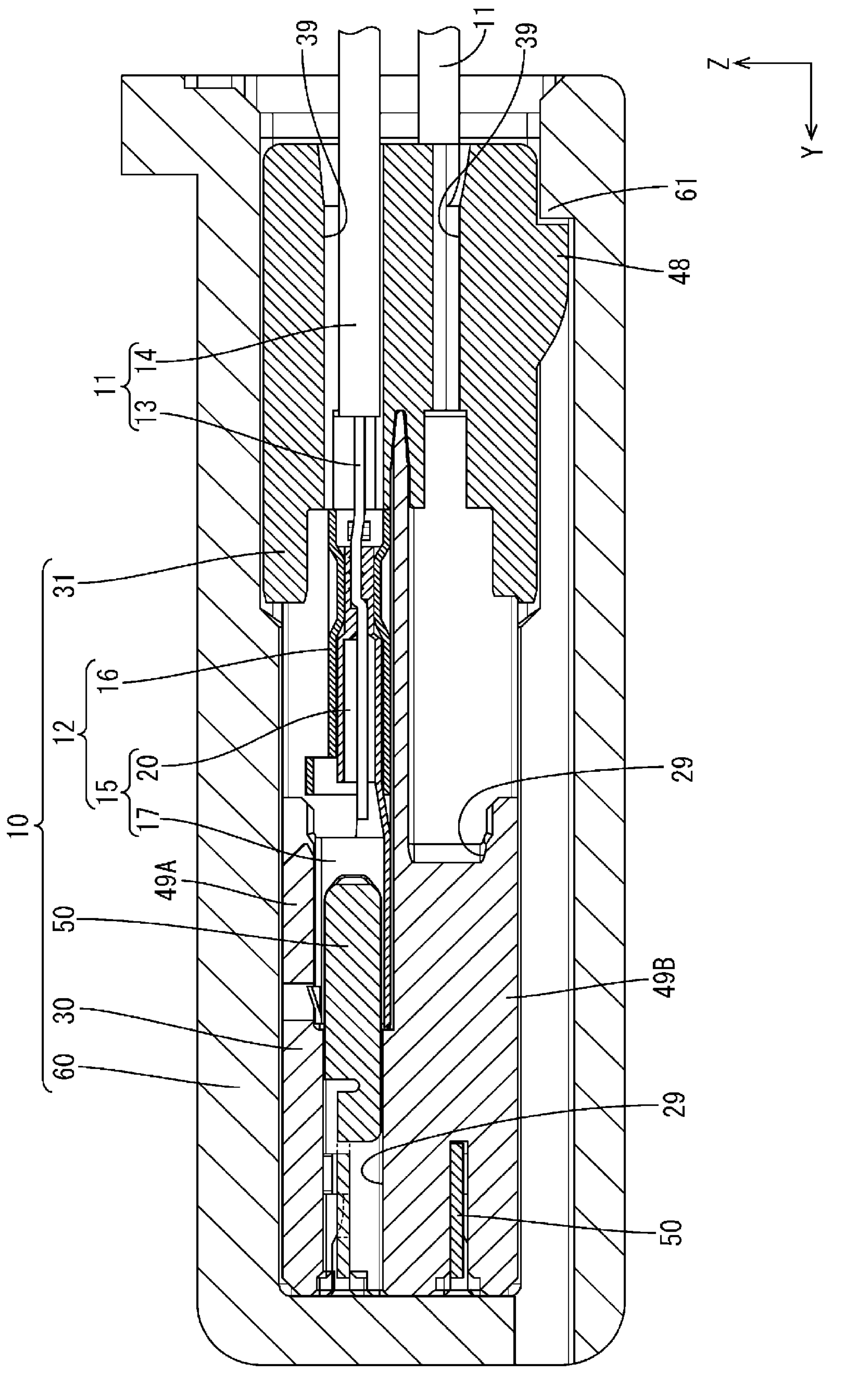
FIG. 1 is a section showing a joint connector according to one embodiment.

First, embodiments of the present disclosure are listed and described.

(1) The present disclosure relates to a joint connector for connecting a plurality of wires, the joint connector including a plurality of terminals to be respectively connected to front end parts in an extending direction of the plurality of wires, a busbar to be connected to the plurality of terminals, and a housing for accommodating the plurality of terminals and the busbar inside, wherein the busbar includes a plurality of tabs and a coupling portion coupling the plurality of tabs, each of the plurality of terminals includes a tube portion, each of the plurality of tabs being insertable into the tube portion, a sandwiching portion extending along the extending direction and configured to sandwich the wire, and a sliding portion disposed outside the sandwiching portion and movable along the extending direction, and the sliding portion includes a pressurizing portion configured to pressurize the sandwiching portion toward the wire with the wire sandwiched by the sandwiching portion.

Since the busbar and the plurality of terminals are accommodated in the housing, it is not necessary to connect a connector accommodating the busbar and a connector accommodating the plurality of terminals. Thus, it is possible to suppress the deformation of the busbar and the sliding wear of the plurality of terminals due to the rattling of the connector accommodating the busbar and the connector accommodating the plurality of terminals. As a result, the electrical connection reliability of the plurality of wires in the joint connector can be improved.

Preferably, the busbar includes a positioning portion configured to contact the housing from front in the extending direction.

Since the positioning portion is in contact with the housing from front, excessive rearward pressing of the busbar beyond a predetermined position is suppressed and the busbar is positioned at the predetermined position in the housing when the busbar is press-fit into the housing from front.

Preferably, the busbar includes a front retaining portion configured to contact the housing from behind in the extending direction.

The pressurizing portion presses the sandwiching portion toward the wire by moving the sliding portion of the terminal forward from a rear side in the extending direction, whereby the wire and the terminal are electrically connected. Thus, the terminal receives a force acting forward from the rear side via the sliding portion. As a result, the force acting forward from the rear side is applied also to the busbar via the tab disposed in the tube portion of the terminal. The front retaining portion provided on the busbar contacts the housing from behind. In this way, a forward movement of the busbar is suppressed. As a result, a forward movement of the busbar beyond the predetermined position in the housing is suppressed.

Preferably, the housing includes an opening open in a direction intersecting the extending direction and a protection wall configured to cover the busbar from the intersecting direction, and the inside and outside of the housing are allowed to communicate by the opening.

A jig or the like can be inserted into the housing to move the sliding portion through the opening allowing communication between the inside and outside of the housing. In this way, a manufacturing operation of the joint connector can be made efficient. Further, since being covered by the protection wall, the busbar can be protected from collision with external matters.

Details of Embodiment of Present Disclosure

Hereinafter, an embodiment of the present disclosure is described. The present invention is not limited to these illustrations and is intended to be represented by claims and include all changes in the scope of claims and in the meaning and scope of equivalents.

Embodiment

One embodiment of the present disclosure is described with reference to FIGS. 1 to 12. A joint connector 10 according to this embodiment electrically connects a plurality of wires 11. In the following description, a direction indicated by an arrow Z is referred to as an upward direction, a direction indicated by an arrow Y is referred to as a forward direction, and a direction indicated by an arrow X is referred to as a leftward direction. Note that, for a plurality of identical members, only some members may be denoted by a reference sign and the other members may not be denoted by the reference sign.

As shown in FIG. 1, the joint connector 10 according to this embodiment includes a plurality of terminals 12 to be respectively connected to front end parts in an extending direction (direction indicated by the arrow Y) of the plurality of wires 11, a busbar 50 to be connected to the plurality of terminals 12, a housing 30 for accommodating the plurality of terminals 12 and the busbar 50 inside, a rear holder 31 to be mounted on a rear end part of the housing 30 and an outer cover 60 for covering the housing 30 from front.

[Wires 11]

As shown in FIG. 1, the plurality of wires 11 are disposed to extend in a front-rear direction (an example of the extending direction). The wire 11 is such that the outer periphery of a core 13 is surrounded by an insulation coating 14 made of insulating synthetic resin. The core 13 according to this embodiment is composed of one metal wire. Note that the core 13 may be a stranded wire formed by twisting a plurality of metal thin wires. An arbitrary metal such as copper, copper alloy, aluminum or aluminum alloy can be appropriately selected as a metal constituting the core 13 if necessary. The core 13 according to this embodiment is made of copper or copper alloy.

[Housing 30]

Figure 2:
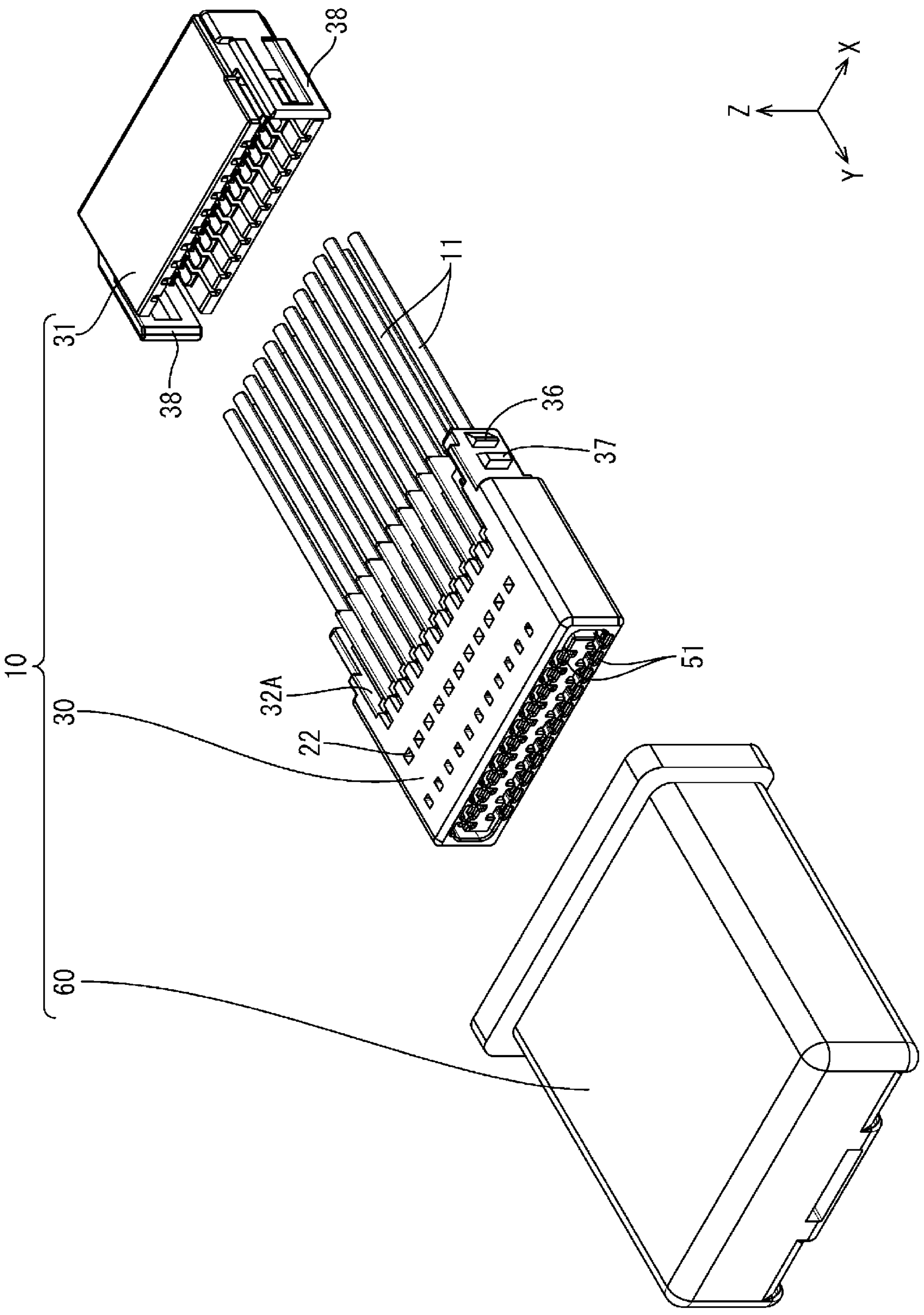
FIG. 2 is an exploded perspective view showing the joint connector.

As shown in FIG. 2, the housing 30 is in the form of a rectangular parallelepiped flat in a vertical direction. The housing 30 is formed by injection-molding a material containing an insulating synthetic resin. A plurality of cavities 29 extending in the front-rear direction are arranged in a lateral direction in two upper and lower stages in the housing 30 (see FIG. 1).

A rear half of the upper wall of the housing 30 is open upward and serves as an upper opening 32A. The inside and outside of the housing 30 are allowed to communicate by the upper opening 32A. Further, a lower opening 32B open downward is formed in a rear half of the lower wall of the housing 30. The inside and outside of the housing 30 are allowed to communicate by the lower opening 32B. Note that the terminals 12 accommodated in the cavities 29 in the lower stage are not shown in FIG. 1.

As shown in FIG. 2, the cavities 29 are open forward in a front end part of the housing 30 and there openings serve as busbar insertion holes 51 through which the busbar 50 is inserted into the cavities 29.

Figure 3:
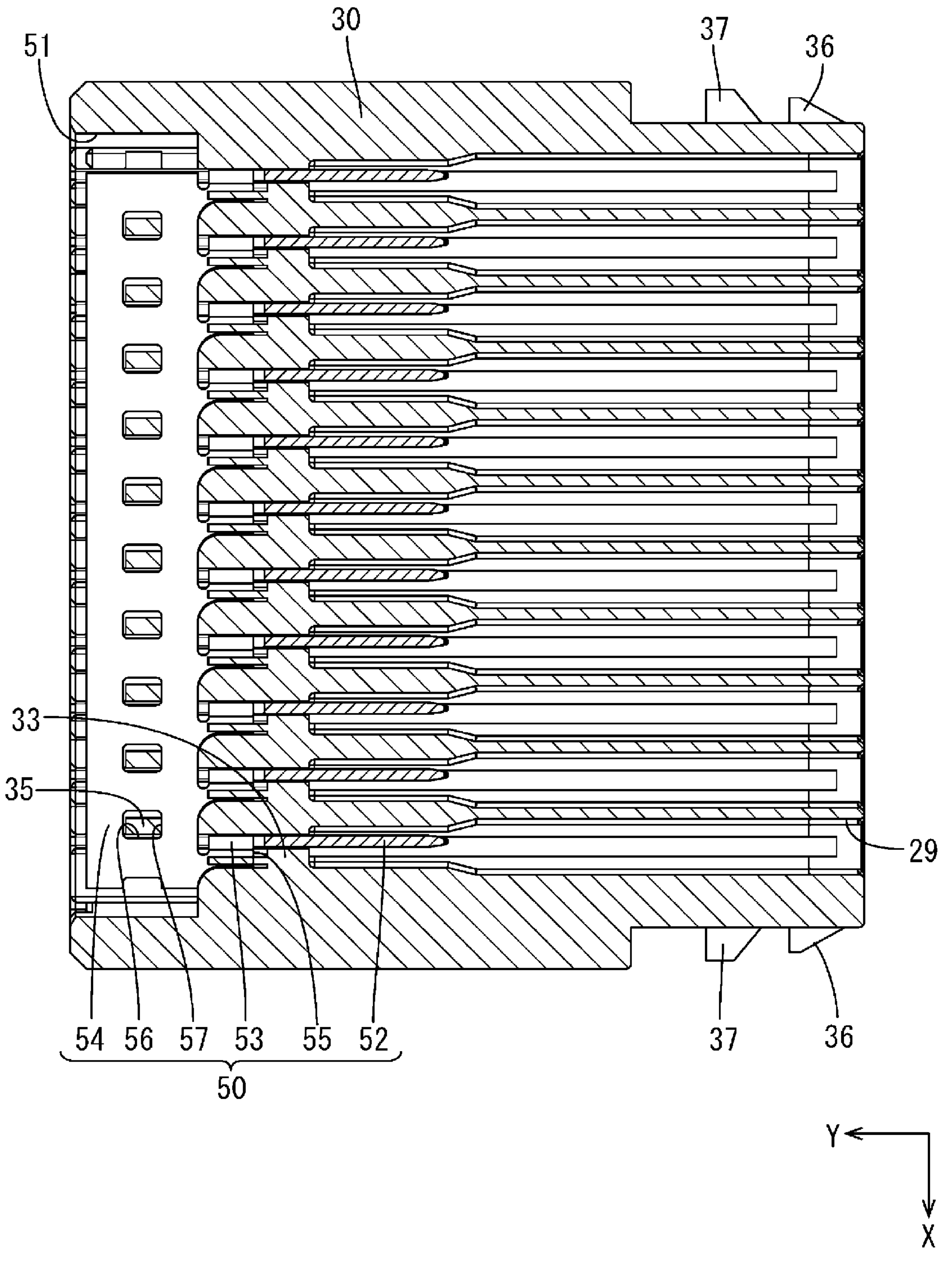
FIG. 3 is a plan view in section showing a state where a busbar is fit in a housing.

As shown in FIG. 3, the housing 30 is formed with tab sandwiching projections 33 projecting rightward from the left side walls of the cavities 29 at positions corresponding to front end parts of tabs 52 to be described later with the busbar 50 inserted in the cavities 29 of the housing 30. An interval between a right end part of the tab sandwiching projection 33 and the cavity 29 is equal to or slightly larger than a width in the lateral direction of the tab 52.

As shown in FIG. 1, the housing 30 includes an upper protection wall 49A (an example of a protection wall) for covering the tabs 52 from above and a lower protection wall 49B (an example of the protection wall) for covering the tabs 52 from below with the busbar 50 inserted in the cavities 29.

As shown in FIG. 3, partial locking portions 36 and full locking portions 37 provided forward of the partial locking portions 36 are formed to project outward at positions near rear end parts of both left and right side walls of the housing 30. Lock receiving portions 38 of the rear holder 31 to be described later are assembled with the partial locking portions 36 and the full locking portions 37.

[Outer Cover 60]

As shown in FIGS. 1 and 2, the housing 30 is covered by the outer cover 60 assembled from front with a rear end part thereof exposed. The outer cover 60 is formed by injection-molding an insulating synthetic resin. The outer cover 60 is in the form of a rectangular tube having a closed front end part and open rearward. A lock claw 61 projecting upward is formed on a rear end part of the lower wall of the outer cover 60.

As shown in FIG. 1, the busbar insertion holes 51 are covered by the outer cover 60 with the outer cover 60 assembled with the housing 30.

[Busbar 50]

Figure 4:
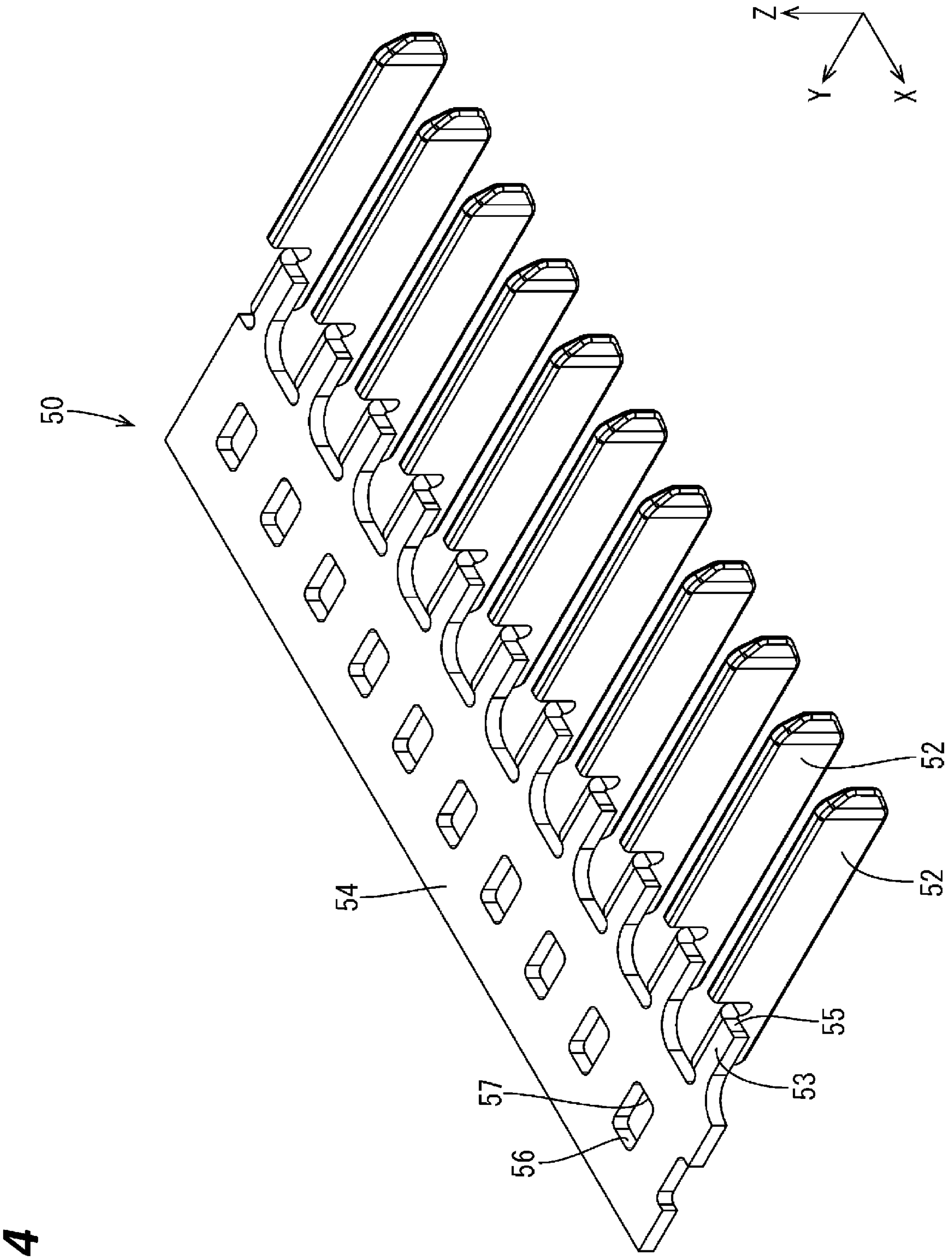
FIG. 4 is a perspective view showing the busbar.

As shown in FIG. 4, the busbar 50 is formed by press-working a metal plate material into a predetermined shape. An arbitrary metal such as copper or copper alloy can be appropriately selected as the metal plate material. The busbar 50 includes a plurality of (eleven in this embodiment) tabs 52 extending rearward and a coupling portion 54 coupling front end parts of the tabs 52 via relay portions 53. The tab 52 is in the form of a plate flat in the lateral direction. The coupling portion 54 is in the form of a plate flat in the vertical direction. The relay portions 53 are formed to extend rearward from the coupling portion 54. The right edge of the relay portion 53 is bent downward and connected to the tab 52.

Figure 5:
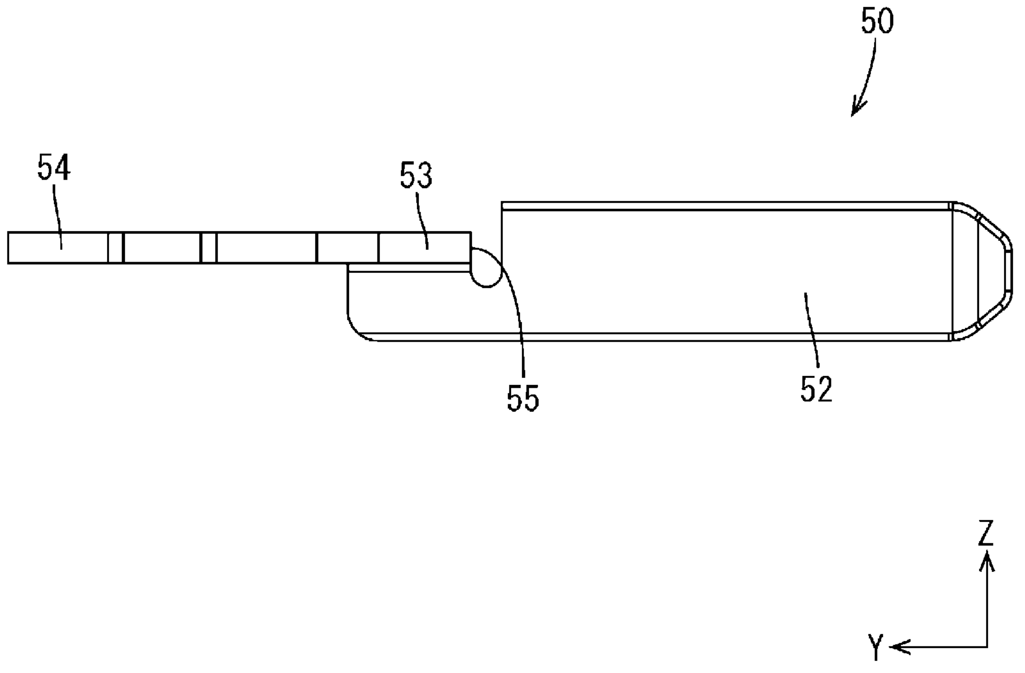
FIG. 5 is a side view showing the busbar.

As shown in FIGS. 4 and 5, a rear end part of the relay portion 53 serves as a positioning portion 55 configured to contact a front end part of the tab sandwiching projection 33 from front. When the busbar 50 is inserted into the cavities 29 from front, the positioning portions 55 contact the front end parts of the tab sandwiching projections 33 to suppress a rearward movement of the busbar 50 and the busbar 50 is positioned at a predetermined position in the housing 30. The positioning portions 55 are formed at positions forward of the tabs 52.

Figure 6:
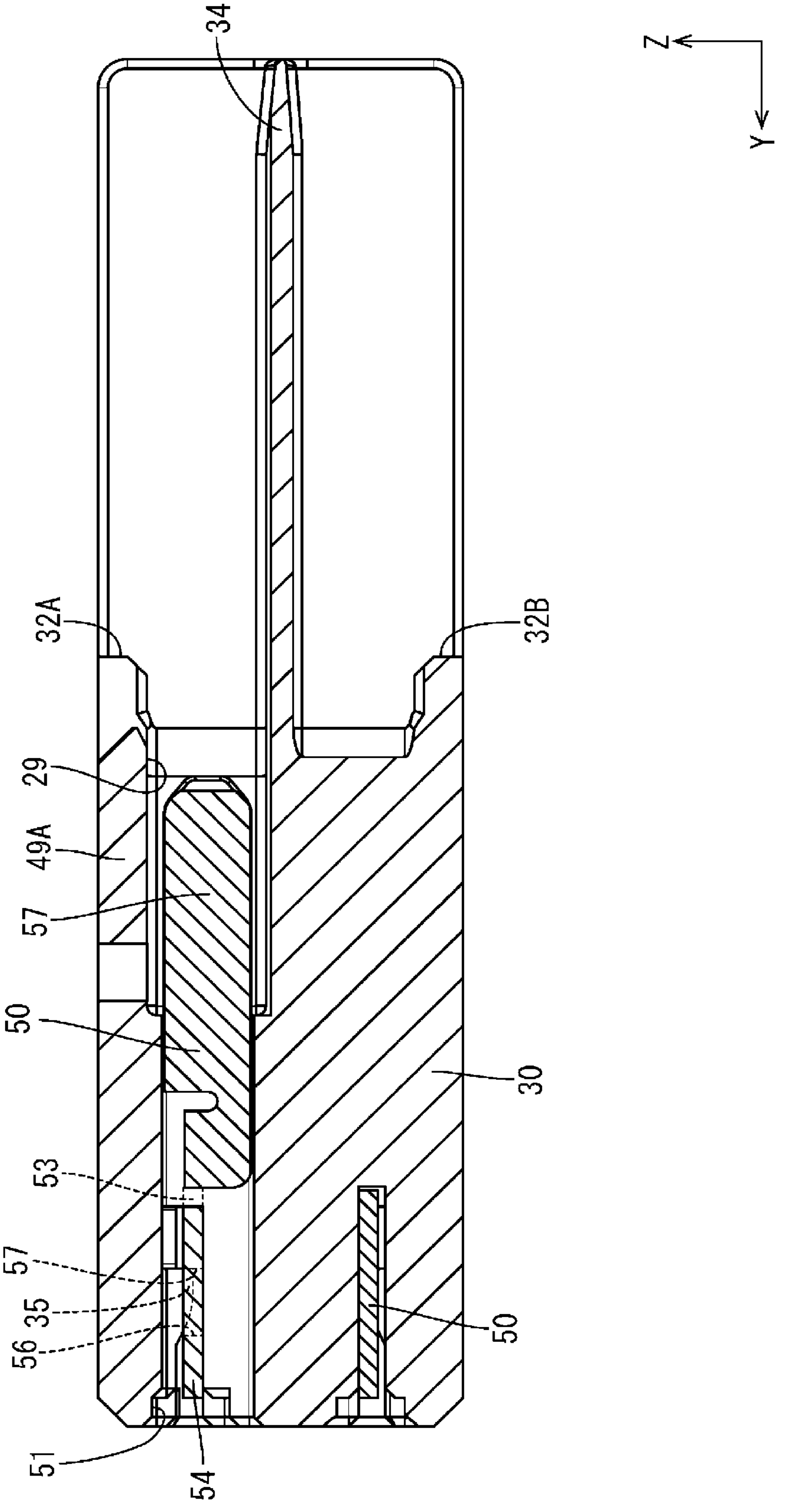
FIG. 6 is a perspective view showing the state where the busbar is fit in the housing.

As shown in FIG. 4, a plurality of (ten in this embodiment) locking holes 56 arranged while being spaced apart in the lateral direction penetrate through the coupling portion 54. When viewed from above, the locking holes 56 have a rectangular shape. As shown in FIGS. 3 and 6, with the busbar 50 inserted in the cavities 29, locking claws 35 projecting from the housing 30 toward the coupling portion 54 are accommodated in the respective locking holes 56. Front hole edge parts of the locking holes 56 contact the locking claws 35 from front, thereby suppressing a forward movement of the busbar 50. The front hole edge parts of the locking holes 56 serve as front retaining portions 57 for suppressing a forward movement of the busbar 50.

[Terminals 12]

Figure 7:
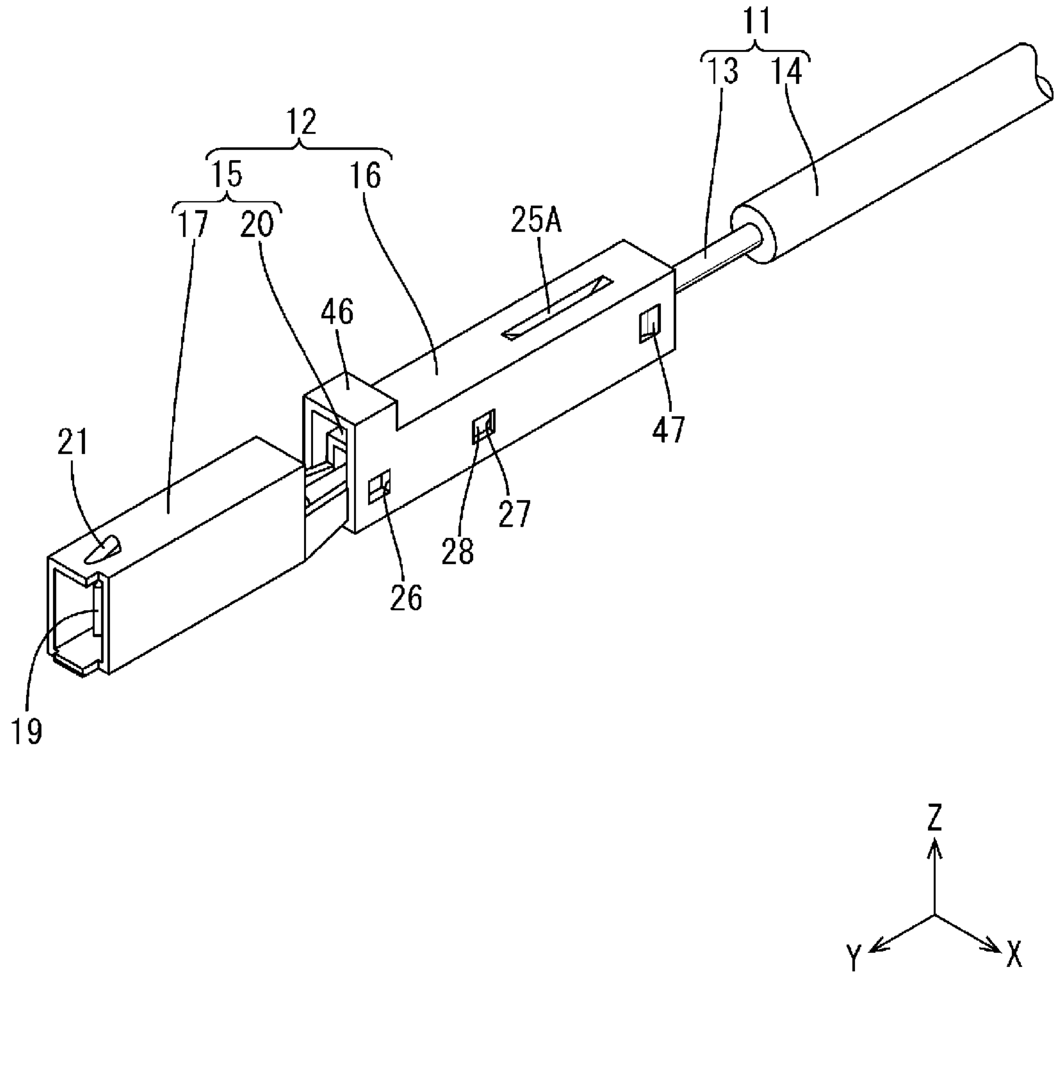
FIG. 7 is a perspective view showing a state where a terminal and a wire are connected.

As shown in FIG. 7, the terminal 12 includes a terminal body 15 made of metal and a sliding portion 16 relatively slidable with respect to the terminal body 15.

[Terminal Bodies 15]

The terminal body 15 is formed into a predetermined shape by a known method such as press-working, cutting or casting. An arbitrary metal such as copper, copper alloy, aluminum, aluminum alloy or stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel or silver can be appropriately selected as a metal constituting the plating layer if necessary. Tin plating is applied to the terminal body 15 according to this embodiment.

Figure 8:
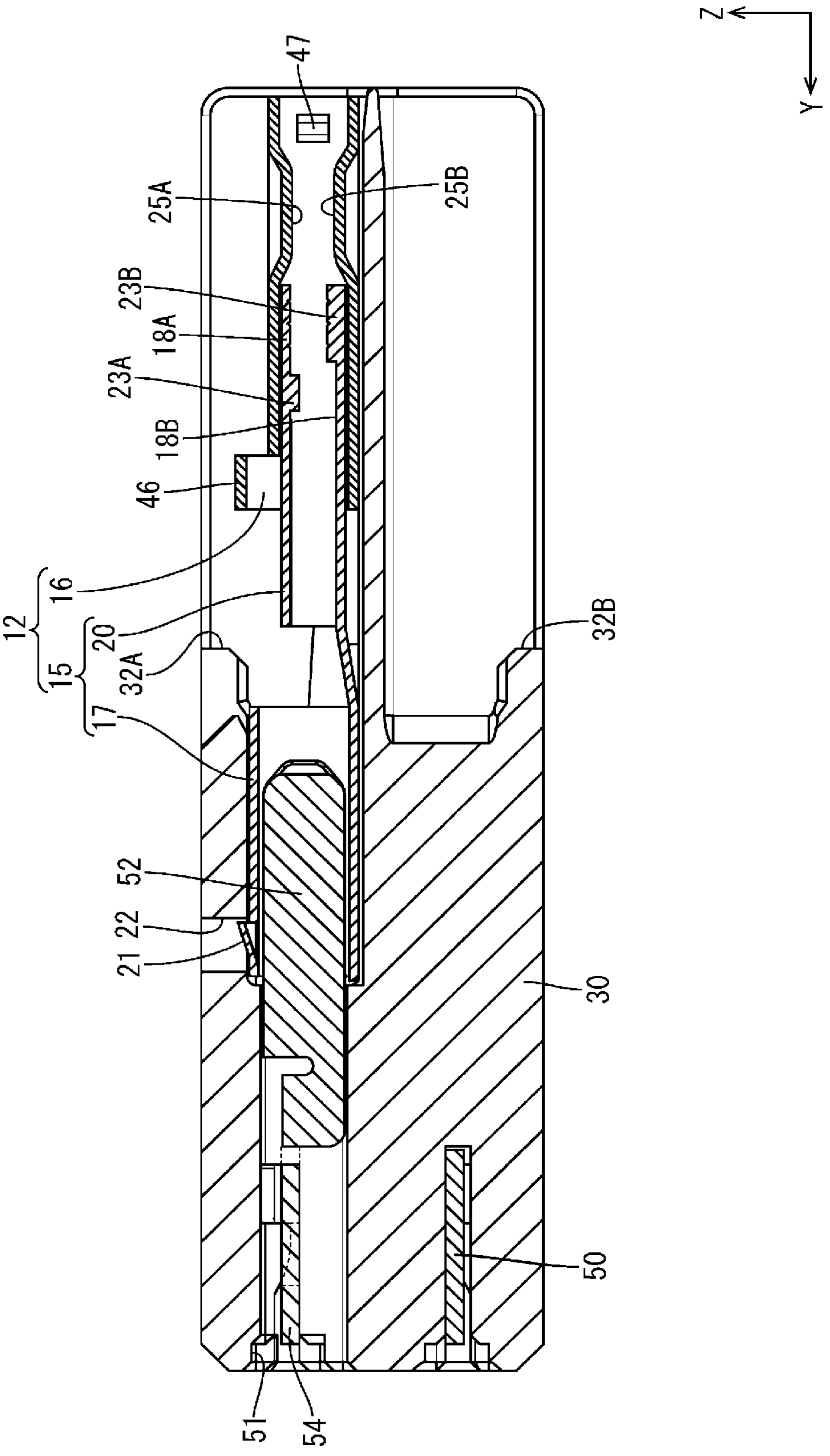
FIG. 8 is a section showing a state where the busbar and the terminals are accommodated in the housing.

As shown in FIG. 8, the terminal body 15 includes a tube portion 17, into which the tab 52 is insertable, and a wire connecting portion 20 located behind the tube portion 17 and to be connected to the wire 11. The wire connecting portion 20 includes an upper sandwiching portion 18A and a lower sandwiching portion 18B extending rearward.

As shown in FIG. 7, the tube portion 17 is in the form of a rectangular tube extending in the front-rear direction. The front end of the tube portion 17 is open so that the tab 52 is insertable. A metal locking lance 21 projecting upward is formed on an outer surface of the tube portion 17. The metal locking lance 21 is locked to a hole edge part of a lance locking hole 22 formed to penetrate through the cavity 29 of the housing 30 in the vertical direction (see FIG. 8). In this way, the terminal 12 is retained not to come out rearward.

As shown in FIG. 7, a resiliently deformable resilient contact piece 19 is disposed inside the tube portion 17. Although not shown in detail, the resilient contact piece 19 has a known configuration extending inward from the inner wall of the tube portion 17. The tab 52 inserted into the tube portion 17 presses and resiliently deforms the resilient contact piece 19. The tab 52 is sandwiched between the inner wall of the tube portion 17 and the resilient contact piece 19 by a resilient force of the resiliently deformed resilient contact piece 19. In this way, the tab 52 and the terminal 12 are electrically connected.

As shown in FIG. 8, the wire connecting portion 20 in the form of a rectangular tube is provided behind the tube portion 17. The upper sandwiching portion 18A (an example of a sandwiching portion) is provided to extend rearward on a rear end part of the upper wall of the wire connecting portion 20, and the lower sandwiching portion 18B (an example of the sandwiching portion) is provided to extend rearward on a rear end part of the lower wall of the wire connecting portion 20. The upper and lower sandwiching portions 18A, 18B have a shape elongated in the front-rear direction. Lengths in the front-rear direction of the upper and lower sandwiching portions 18A, 18B are substantially equal.

An upper holding protrusion 23A projecting downward is provided at a position forward of a rear end part on the lower surface of the upper sandwiching portion 18A. A lower holding protrusion 23B projecting upward is provided on a rear end part on the upper surface of the lower sandwiching portion 18B. The lower and upper holding protrusions 23B, 23A are provided at positions shifted in the front-rear direction.

The lower surface of the upper sandwiching portion 18A and the upper surface of the lower sandwiching portion 18B bite into an oxide film formed on the surface of the core 13 to peel off the oxide film, thereby exposing the metal surface of the core 13. By the contact of this metal surface and the upper and lower sandwiching portions 18A, 18B, the core 13 and the terminal body 15 are electrically connected.

[Sliding Portions 16]

As shown in FIG. 7, the sliding portion 16 is in the form of a rectangular tube extending in the front-rear direction. The sliding portion 16 is formed into a predetermined shape by a known method such as cutting, casting or press-working. An arbitrary metal such as copper, copper alloy, aluminum, aluminum alloy or stainless steel can be appropriately selected as a metal constituting the sliding portion 16 if necessary. Although not particularly limited, the sliding portion 16 according to this embodiment is made of stainless steel. A plating layer may be formed on the surface of the sliding portion 16. An arbitrary metal such as tin, nickel or silver can be appropriately selected as a metal constituting the plating layer if necessary.

A cross-sectional shape of the sliding portion 16 is the same as or somewhat larger than that of a region of the terminal body 15 where the upper and lower sandwiching portions 18A, 18B are provided. In this way, the sliding portion 16 is disposed outside the region of the terminal body 15 where the upper and lower sandwiching portions 18A, 18B are provided.

As shown in FIG. 8, an upper pressurizing portion 25A (an example of a pressurizing portion) projecting downward is provided on the lower surface of the upper wall of the sliding portion 16. A lower pressurizing portion 25B (an example of the pressurizing portion) projecting upward is provided on the upper surface of the lower wall of the sliding portion 16.

As shown in FIG. 7, a partial lock receiving portion 26 is open at a position near a front end part in the front-rear direction in a side wall of the sliding portion 16. Further, a full lock receiving portion 27 is open at a position behind the partial lock receiving portion 26 in the side wall of the sliding portion 16. The partial lock receiving portion 26 and the full lock receiving portion 27 are resiliently lockable to a locking projection 28 provided on a side wall of the terminal body 15.

With the locking projection 28 of the terminal body 15 and the partial lock receiving portion 26 of the sliding portion 16 locked, the sliding portion 16 is held at a partial locking position with respect to the terminal body 15 (see FIG. 8). In this state, the upper and lower pressurizing portions 25A, 25B of the sliding portion 16 are separated rearward from the rear end edges of the upper and lower sandwiching portions 18A, 18B of the terminal body 15. Further, in this state, an interval between the upper and lower sandwiching portions 18A, 18B is set to be larger than a diameter of the core 13.

Figure 11:
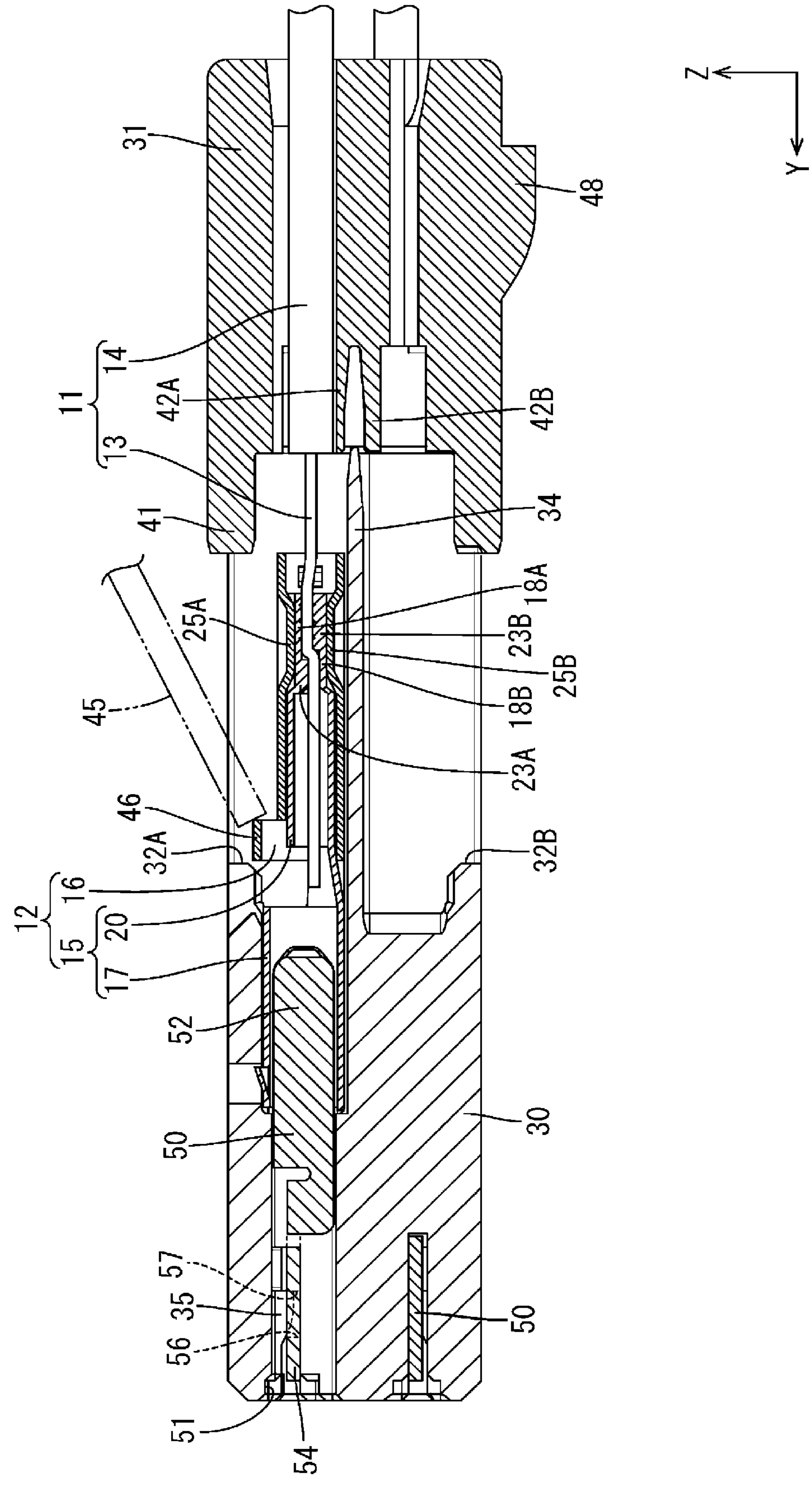
FIG. 11 is a section showing a state where the terminal and the wire are connected by moving a sliding portion by a jig.

A state where the locking projection 28 of the terminal body 15 and the full lock receiving portion 27 of the sliding portion 16 are locked is a state where the sliding portion 16 is locked at a full locking position with respect to the terminal body 15 (see FIGS. 7 and 11). In this state, the upper pressurizing portion 25A of the sliding portion 16 is in contact with the upper sandwiching portion 18A from above the upper sandwiching portion 18A. Further, the lower pressurizing portion 25B of the sliding portion 16 is in contact with the lower sandwiching portion 18B from below the lower sandwiching portion 18B.

As described above, the sliding portion 16 is slidable between the partial locking position and the full locking position while being externally fit to the region of the terminal body 15 where the upper and lower sandwiching portions 18A, 18B are provided.

As shown in FIG. 11, with the sliding portion 16 held at the full locking position with respect to the terminal body 15, the upper pressurizing portion 25A presses the upper sandwiching portion 18A from above, whereby the upper sandwiching portion 18A is deformed downward. Further, the lower pressurizing portion 25B presses the lower sandwiching portion 18B from below, whereby the lower sandwiching portion 18B is deformed upward. In this way, with the core 13 disposed to extend in the front-rear direction (extending direction) in a space between the upper and lower sandwiching portions 18A and 18B and the sliding portion 16 held at the full locking position with respect to the terminal body 15, the core 13 is sandwiched in the vertical direction by the resiliently deformed upper and lower sandwiching portions 18A, 18B. That is, the upper sandwiching portion 18A is pressed downward by the upper pressurizing portion 25A, thereby contacting the core 13 from above, and the lower sandwiching portion 18B is pressed upward by the lower pressurizing portion 25B, thereby contacting the core 13 from below.

As shown in FIG. 11, with the sliding portion 16 held at the full locking position with respect to the terminal body 15, the upper holding protrusion 23A of the upper sandwiching portion 18A presses the core 13 from above and the lower holding protrusion 23B of the lower sandwiching portion 18B presses the core 13 from below. In this way, the core 13 is pressed from above by the upper holding protrusion 23A and pressed from below by the lower holding protrusion 23B disposed at the position shifted from the upper holding protrusion 23A in the front-rear direction, thereby being held in a state bent in the vertical direction (an example of a direction intersecting the extending direction). The core 13 and the terminal 12 are electrically connected also by the upper and lower holding protrusions 23A, 23B.

As shown in FIG. 11, a jig contact portion 46 projecting upward from the upper wall is provided on a front end part of the sliding portion 16. By bringing a jig 45 into contact with the jig contact portion 46 from behind and pressing the sliding portion 16 forward by this jig 45, the sliding portion 16 is movable forward. Note that the jig 45 is relatively smaller in size than a mold and a facility for operating this mold. Thus, a cost increase due to the jig 45 is suppressed.

As shown in FIG. 8, a pair of guiding portions 47 projecting inwardly of the sliding portion 16 are provided at positions near a rear end part of the sliding portion 16 on both left and right side walls. The guiding portions 47 are formed to become narrower from a rear side toward a front side. The core 13 is guided into the sliding portion 16 by the sliding contact of the core 13 with the inner surfaces of the guiding portions 47.

[Rear Holder 31]

As shown in FIG. 2, the rear holder 31 is in the form of a box open forward. The rear holder 31 is formed by injection-molding an insulating synthetic resin. The rear holder 31 is externally fit to a rear half of the housing 30. The lock receiving portions 38 resiliently lockable to the partial locking portions 36 and the full locking portions 37 of the housing 30 are provided at positions near front end parts of both left and right side walls of the rear holder 31. The lock receiving portions 38 are substantially gate-shaped.

Figure 9:
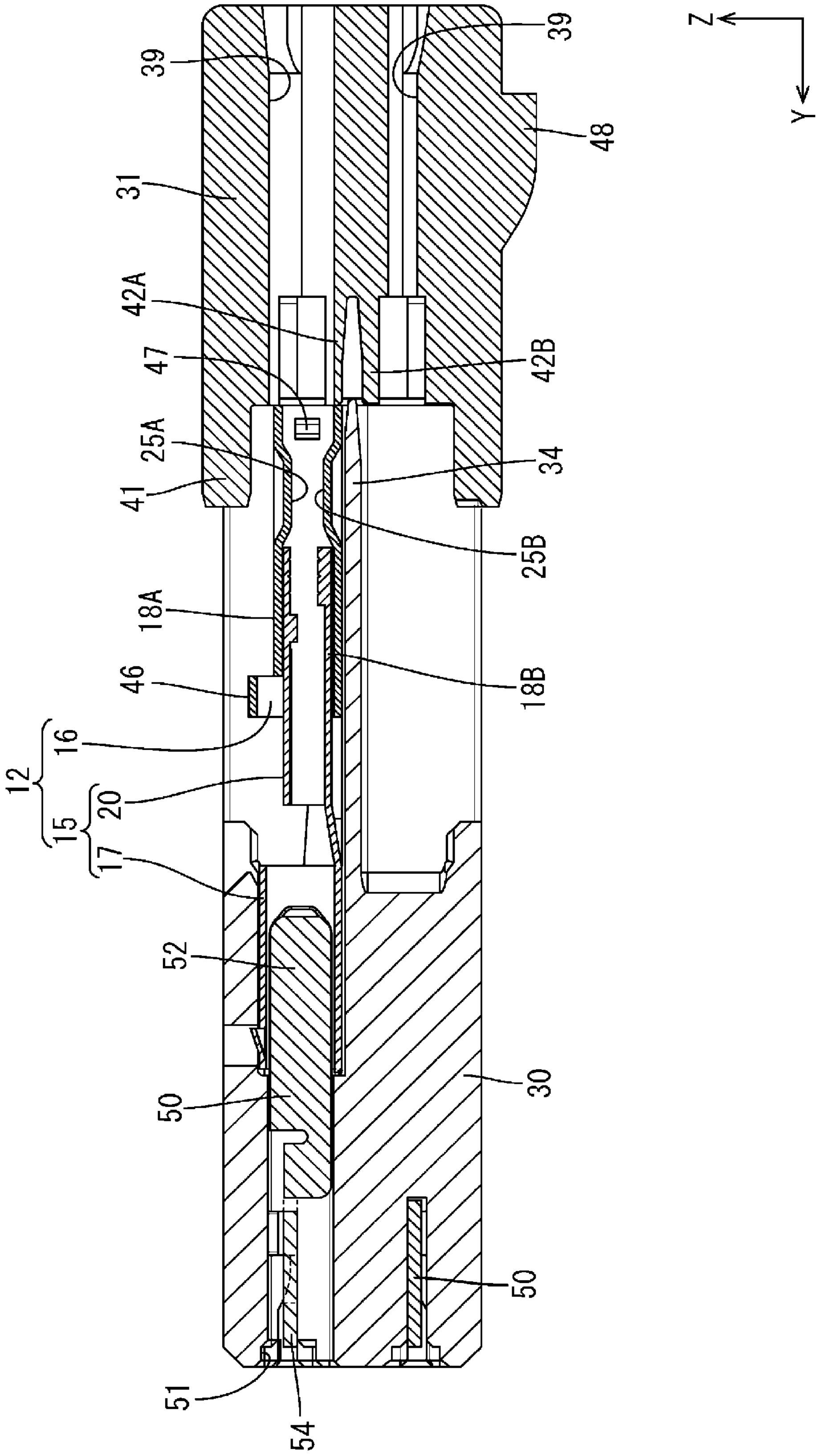
FIG. 9 is a section showing a state where a rear holder is mounted on the housing with the busbar and the terminals accommodated in the housing.

By locking the partial locking portions 36 of the housing 30 and the lock receiving portions 38 of the rear holder 31, the rear holder 31 is held at a partial locking position with respect to the housing 30 (see FIG. 9). Further, by locking the full locking portions 37 of the housing 30 and the lock receiving portions 38 of the rear holder 31, the rear holder 31 is held at a full locking position with respect to the housing 30 (see FIG. 12).

A plurality of insertion holes 39 into which the wires 11 are inserted as shown in FIG. 9 and which are arranged in parallel in the lateral direction in two upper and lower stages are provided in the rear holder 31. The insertion holes 39 are provided at positions corresponding to the cavities 29 of the housing 30. An inner diameter of the insertion hole 39 is set to be equal to or somewhat larger than an outer diameter of the insulation coating 14 of the wire 11.

As shown in FIG. 9, a receptacle 41 into which the housing 30 is fit is open forward in the rear holder 31. A pair of projecting walls 42A, 42B projecting forward into the receptacle 41 and spaced apart in the vertical direction are provided near a vertical center on a rear end part of the receptacle 41. A vertical interval between this pair of projecting walls 42A and 42B is set to be equal to or somewhat larger than a vertical thickness of a separation wall 34 of the housing 30.

Figure 12:
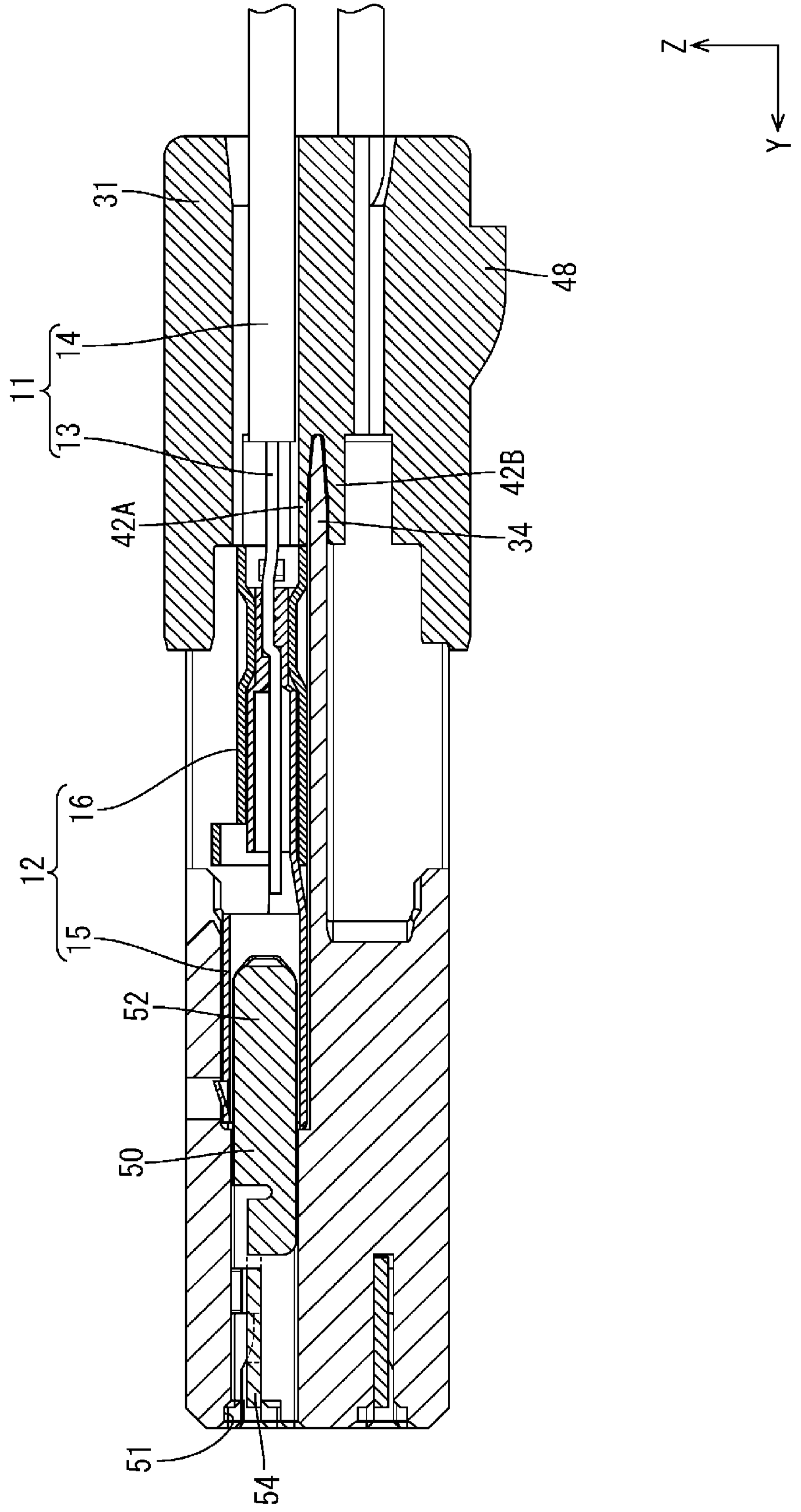
FIG. 12 is a section showing a state where the rear holder is disposed at a full locking position with respect to the housing.

As shown in FIG. 9, with the rear holder 31 held at the partial locking position with respect to the housing 30, the pair of projecting walls 42A, 42B of the rear holder 31 are located behind the rear end edge of the separation wall 34 of the housing 30. As shown in FIG. 12, with the rear holder 31 held at the full locking position with respect to the housing 30, the separation wall 34 of the housing 30 is fit between the pair of projecting walls 42A, 42B of the rear holder 31. In this way, a position shift of the rear holder 31 in the vertical direction with respect to the housing 30 is suppressed.

As shown in FIG. 1, a cover lock portion 48 projecting downward at a position near a rear end part is provided on the lower surface of the rear holder 31. The lock claw 61 of the outer cover 60 contacts the cover lock portion 48 of the rear holder 31 from behind, whereby the rear holder 31 and the connector are retained and held not to come out rearward in the outer cover 60.

[Assembling Process of Joint Connector 10]

Next, an example of an assembling process of the joint connector 10 according to this embodiment is described. The assembling process of the joint connector 10 is not limited to the one described below. Note that the terminals 12 and the wires 11 disposed in the cavities 29 in the lower stage are not shown in FIGS. 6 and 8 to 12.

The terminal body 15 and the sliding portion 16 are formed by a known method. The sliding portion 16 is assembled with the terminal body 15 from behind. The front end edge of the sliding portion 16 comes into contact with the locking projection 28 of the terminal body 15 from behind, thereby expanding and deforming the side wall of the sliding portion 16. If the sliding portion 16 is further pushed, the side wall of the sliding portion 16 is restored and the partial lock receiving portion 26 of the sliding portion 16 is locked to the locking projection 28 of the terminal body 15. In this way, the sliding portion 16 is held at the partial locking position with respect to the terminal body 15. In this way, the terminal 12 is obtained.

By injection-molding the synthetic resin, the housing 30 and the rear holder 31 are formed.

As shown in FIGS. 3 and 6, the busbar 50 is inserted into the busbar insertion holes 51 of the housing 30 from front. The locking claws 35 of the housing 30 are inserted into the locking holes 56 of the busbar 50, whereby the busbar 50 is retained and held in the housing 30. Further, the positioning portions 55 of the busbar 50 contact the front end parts of the tab sandwiching projections 33 of the housing 30, whereby the busbar 50 is held in a front stop state at a predetermined position in the housing 30.

As shown in FIG. 8, the terminal 12 is inserted into the cavity 29 of the housing 30 from behind. The metal locking lance 21 of the terminal 12 is locked into the lance locking hole 22 of the housing 30 from front, whereby the terminal 12 is retained and held not to come out rearward. The tab 52 of the busbar 50 is inserted into the tube portion of the terminal 12. By the contact of the tab 52 and the resilient contact piece 19, the tab 52 and the terminal 12 are electrically connected. In this way, the plurality of terminals 12 are electrically connected via the busbar 50.

As shown in FIG. 9, the rear holder 31 is assembled with the rear end part of the housing 30 from behind. Then, the front end part of the rear holder 31 comes into contact with the partial locking portions 36 of the housing 30 from behind and the front end part of the rear holder 31 is expanded and deformed. If the rear holder 31 is further pushed forward, the front end part of the rear holder 31 is restored and the lock receiving portions 38 of the rear holder 31 are resiliently locked to the partial locking portions 36 of the housing 30. In this way, the rear holder 31 is held at the partial locking position with respect to the housing 30. In this state, the rear holder 31 is disposed at a position separated rearward from the rear end edges of the sliding portions 16.

Figure 10:
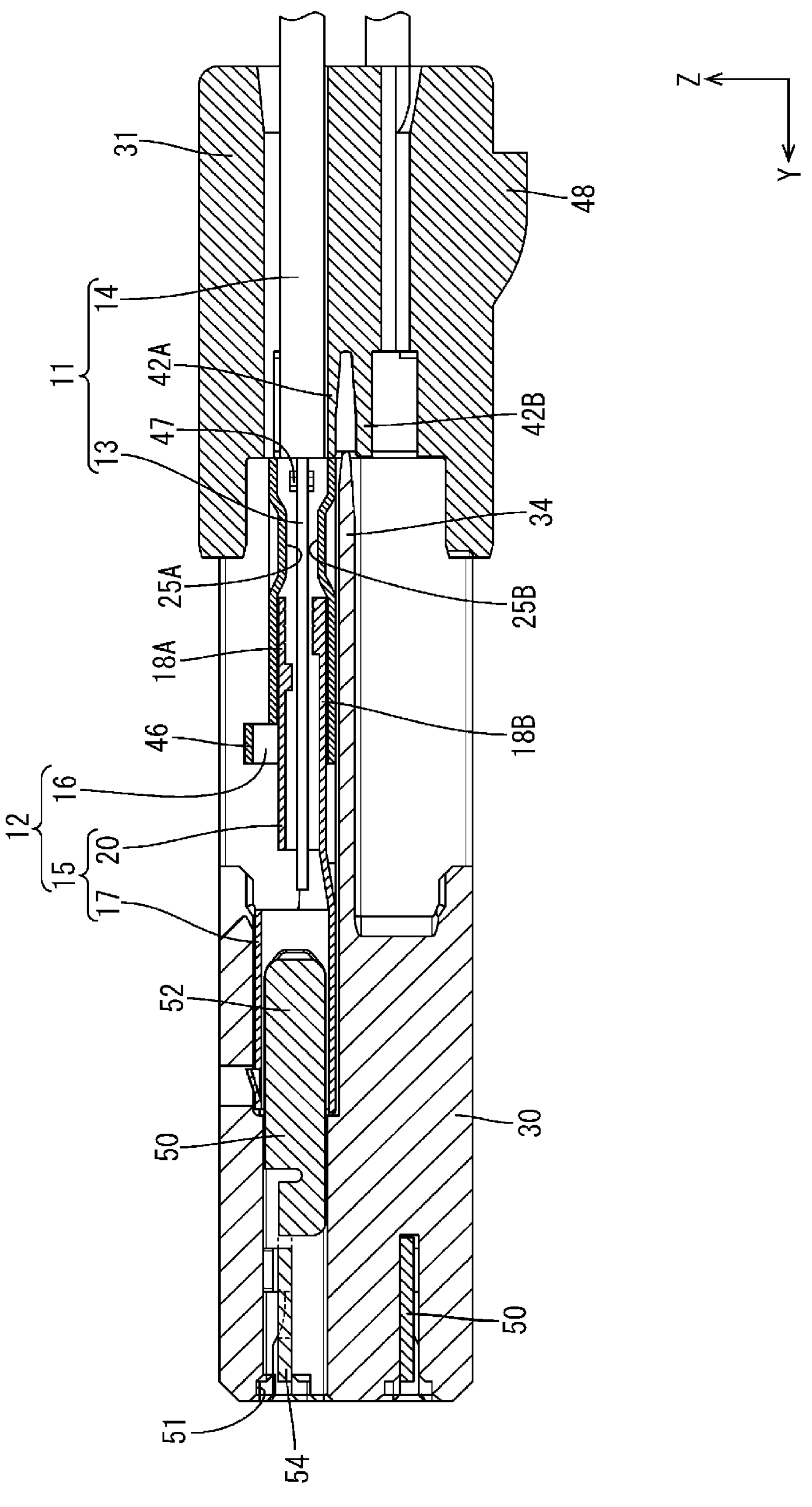
FIG. 10 is a section showing a state where a core of the wire is inserted in the terminal.

The core 13 of the wire 11 is exposed by stripping the insulation coating 14 by a known method. As shown in FIG. 10, the front end part of the core 13 is inserted from behind into the insertion hole 39 provided in the rear end part of the rear holder 31.

If the wire 11 is further pushed forward, the front end part of the core 13 is introduced into the sliding portion 16 from the rear end part of the sliding portion 16. The core 13 is guided into the sliding portion 16 by coming into contact with the guiding portions 47 of the sliding portion 16. If the wire 11 is further pushed forward, the front end part of the core 13 enters the terminal body 15 and reaches the space between the upper and lower sandwiching portions 18A, 18B.

As shown in FIG. 10, with the sliding portion 16 held at the partial locking position with respect to the terminal body 15 and the rear holder 31 held at the partial locking position with respect to the housing 30, the interval between the upper and lower sandwiching portions 18A, 18B is set to be larger than an outer diameter of the core 13.

Subsequently, as shown in FIG. 11, after the jig 45 is inserted into the housing 30 through the upper opening 32A and brought into contact with the jig contact portion 46 from behind and the sliding portion 16 is slid forward, the rear holder 31 is moved forward. The sliding portion 16 is moved relatively forward with respect to the terminal body 15. At this time, locking between the locking projection 28 of the terminal body 15 and the partial lock receiving portion 26 of the sliding portion 16 is released and the side wall of the sliding portion 16 rides on the locking projection 28 to be expanded and deformed.

When the sliding portion 16 is moved forward, the side wall of the sliding portion 16 is restored and the locking projection 28 of the terminal body 15 and the full lock receiving portion 27 of the sliding portion 16 are resiliently locked. In this way, the sliding portion 16 is held at the full locking position with respect to the terminal body 15.

With the sliding portion 16 held at the full locking position with respect to the terminal body 15, the upper pressurizing portion 25A of the sliding portion 16 comes into contact with the upper sandwiching portion 18A of the terminal body 15 from above to press the upper sandwiching portion 18A downward. Further, the lower pressurizing portion 25B of the sliding portion 16 comes into contact with the lower sandwiching portion 18B of the terminal body 15 from below to press the lower sandwiching portion 18A upward. In this way, the core 13 is sandwiched from upper and lower sides by the upper and lower sandwiching portions 18A, 18B (see FIG. 11).

As shown in FIG. 11, the core 13 is sandwiched by the lower surface of the upper sandwiching portion 18A and the upper surface of the lower sandwiching portion 18B, whereby the oxide film formed on the surface of the core 13 is peeled off to expose the metal surface constituting the core 13. By the contact of this metal surface and the upper and lower sandwiching portions 18A, 18B, the wire 11 and the terminal 12 are electrically connected. In this way, the plurality of wires 11 are electrically connected via the terminals 12 and the busbar 50.

With the core 13 sandwiched from upper and lower sides by the upper and lower sandwiching portions 18A, 18B, the core 13 extends in the front-rear direction and is held in the state bent in the vertical direction by being sandwiched by the upper holding protrusion 23A of the upper sandwiching portion 18A and the lower holding protrusion 23B of the lower sandwiching portion 18B. Since the core 13 can be firmly held in this way, a holding force of the wire 11 and the terminal 12 can be enhanced when a pulling force is applied to the wire 11.

Subsequently, when the rear holder 31 is pushed forward, the front end part of the rear holder 31 rides on the partial locking portions 37 of the housing 30 to be expanded and deformed. If the rear holder 31 is further pushed forward, the full locking portions 37 of the housing 30 and the lock receiving portions 38 of the rear holder 31 are locked. In this way, the rear holder 31 is held at the full locking position with respect to the housing 30 as shown in FIG. 12.

Finally, as shown in FIG. 1, the outer cover 60 is fit to the housing 30 from front of the housing 30. The lock claw 61 provided on the rear end part of the outer cover 60 contacts the cover lock portion 48 provided on the rear holder 31 from behind, whereby the housing 30 is retained and held not to come out rearward in the outer cover 60. In this way, the joint connector 10 is completed.

[Functions and Effects of Embodiment]

Next, functions and effects of this embodiment are described. The joint connector 10 for connecting the plurality of wires 11 includes the plurality of terminals 12 to be respectively connected to the front end parts in the extending direction of the plurality of wires 11, the busbar 50 to be connected to the plurality of terminals 12, and the housing 30 for accommodating the plurality of terminals 12 and the busbar 50 inside. The busbar 50 includes the plurality of tabs 52 extending rearward, and the coupling portion 54 coupling the plurality of tabs 52. Each of the plurality of terminals 12 includes the tube portion 17, each of the plurality of tabs 52 being inserted into the tube portion 17, the upper and lower sandwiching portions 18A, 18B extending along the extending direction and configured to sandwich the wire 11, and the sliding portion 16 disposed outside the upper and lower sandwiching portions 18A, 18B and movable along the front-rear direction. The sliding portion 16 includes the upper and lower pressurizing portions 25A, 25B for pressurizing the upper and lower sandwiching portions 18A, 18B toward the wire 11 with the wire 11 sandwiched by the upper and lower sandwiching portions 18A, 18B.

Since the busbar 50 and the plurality of terminals 12 are accommodated in the housing 30, it is not necessary to connect a connector accommodating the busbar 50 and a connector accommodating the plurality of terminals 12. Thus, it is possible to suppress the deformation of the busbar 50 and the sliding wear of the terminals 12 due to the rattling of the connector accommodating the busbar 50 and the connector accommodating the plurality of terminals 12. As a result, electrical connection reliability between the plurality of wires 11 in the joint connector 10 can be improved.

According to this embodiment, the busbar 50 includes the positioning portions 55 configured to contact the housing 30 from front.

Since the positioning portions 55 contact the housing 30 from front, excessive rearward pushing of the busbar 50 beyond the predetermined position is suppressed and the busbar is positioned at the predetermined position in the housing 30 when the busbar 50 is press-fit into the housing 30 from front.

According to this embodiment, the busbar 50 includes the front retaining portions 57 configured to contact the tab sandwiching projections 33 of the housing 30 from behind.

The sliding portion 16 of the terminal 12 is moved forward from the rear side in the extending direction, and the upper pressurizing portion 25A presses the upper sandwiching portion 18A downward and the lower pressurizing portion 25B presses the lower sandwiching portion 18B upward to sandwich the core 13 of the wire 11 by the upper and lower sandwiching portions 18A, 18B, whereby the wire 11 and the terminal 12 are electrically connected. Thus, the terminal 12 receives a force acting forward from the rear side via the sliding portion 16. As a result, the force acting forward from the rear side is applied also to the busbar 50 via the tab 52 disposed in the tube portion 17 of the terminal 12. The front retaining portions 57, which are the front hole edge parts of the locking holes 56 provided in the coupling portion 54 of the busbar 50, contact the locking claws 35 of the housing 30 from behind. In this way, a forward movement of the busbar 50 is suppressed by the locking claws 35. As a result, a forward movement of the busbar 50 beyond the predetermined position in the housing 30 is suppressed.

According to this embodiment, the housing 30 includes the upper opening 32A open upward, the lower opening 32B open downward, the upper protection wall 49A for covering the busbar 50 from above and the lower protection wall 49B for covering the busbar 50 from below, and the inside and outside of the housing 30 are allowed to communicate by the upper and lower openings 32A, 32B.

The sliding portions 16 can be moved by the jig 45 or the like inserted into the housing 30 through the upper and lower openings 32A, 32B allowing communication between the inside and outside of the housing 30. In this way, a manufacturing operation of the joint connector 10 can be made efficient. Further, since being covered from above and below by the upper and lower protection walls 49A, 49B, the busbar 50 can be protected from collision with external matters.

Other Embodiments

The present disclosure is not limited to the above described and illustrated embodiment. For example, the following embodiments are also included in the technical scope of the technique disclosed in this specification.

(1) The positioning portions 55 may be omitted.

(2) The front retaining portions 57 may be omitted.

(3) The cavities 29 may be formed in one, three or more stages in the vertical direction.

(4) The outer cover 60 may be omitted. In this case, the cavities 29 and the upper and lower openings 32A, 32B may be closed, for example, by winding a tape around the housing 30.

(5) The terminal may include, one, three or more sandwiching portions.

LIST OF REFERENCE NUMERALS

10: joint connector
11: wire
12: terminal
13: core
14: insulation coating
15: terminal body
16: sliding portion
17: tube portion
18A: upper sandwiching portion
18B: lower sandwiching portion
19: resilient contact piece
20: wire connecting portion
21: metal locking lance
22: lance locking hole
23A: upper holding protrusion

23B: lower holding protrusion
25A: upper pressurizing portion
25B: lower pressurizing portion
26: partial lock receiving portion
27: full lock receiving portion
28: locking projection
29: cavity
30: housing
31: rear holder
32A: upper opening
32B: lower opening
33: tab sandwiching projection
34: separation wall
35: locking claw
36: partial locking portion
37: full locking portion
38: lock receiving portion
39: insertion hole
41: receptacle
42A, 42B: projecting wall
45: jig
46: jig contact portion
47: guiding portion
48: cover lock portion
49A: upper protection wall
49B: lower protection wall
50: busbar
51: busbar insertion hole
52: tab
53: relay portion
54: coupling portion
55: positioning portion
56: locking hole
57: front retaining portion
60: outer cover
61: lock claw

What is claimed is:

1. A joint connector for connecting a plurality of wires, comprising:

a plurality of terminals to be respectively connected to front end parts of the plurality of wires;

a busbar to be connected to the plurality of terminals; and a housing for accommodating the plurality of terminals and the busbar inside, wherein:

the busbar includes a plurality of tabs and a coupling portion coupling the plurality of tabs, each of the plurality of terminals includes a tube portion, each of the plurality of tabs being insertable into the tube portion, a sandwiching portion extending along an extending direction of the wire and configured to sandwich the wire, and a sliding portion disposed outside the sandwiching portion and movable along the extending direction, the sliding portion includes a pressurizing portion configured to pressurize the sandwiching portion toward the wire with the wire sandwiched by the sandwiching portion, and the housing includes an opening open in a direction intersecting the extending direction to expose the sliding portion.

2. The joint connector of claim 1, wherein the busbar includes a positioning portion configured to contact one end of the housing.

3. The joint connector of claim 2, wherein the busbar includes a front retaining portion configured to contact another end of the housing opposite to the one end of the housing in the extending direction.

4. The joint connector of claim 1, wherein:

the housing further includes a protection wall configured to cover the busbar from the intersecting direction, and the inside and outside of the housing are allowed to communicate by the opening.

5. The joint connector of claim 1, wherein:

the sliding portion includes a projection exposed through the opening such that the sliding portion is slidable by pressing the projection.

6. The joint connector of claim 1, wherein:

the tube portion and the sandwiching portion are in a unitary structure.

* * * * *